United States Patent
Graser et al.

(10) Patent No.: US 9,251,323 B2
(45) Date of Patent: Feb. 2, 2016

(54) SECURE ACCESS TO A PLURALITY OF SYSTEMS OF A DISTRIBUTED COMPUTER SYSTEM BY ENTERING PASSWORDS

(75) Inventors: Thomas Graser, Leonberg (DE); Bernd Jostmeyer, Weil im Schonbuch (DE); Norbert Lenz, Magstadt (DE); Andreas Schauberer, Jettingen (DE); Wolfgang Schaeberle, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 2105 days.

(21) Appl. No.: 12/094,858

(22) PCT Filed: Aug. 17, 2006

(86) PCT No.: PCT/EP2006/065398
§ 371 (c)(1),
(2), (4) Date: May 23, 2008

(87) PCT Pub. No.: WO2007/060034
PCT Pub. Date: May 31, 2007

(65) Prior Publication Data
US 2008/0276308 A1 Nov. 6, 2008

(30) Foreign Application Priority Data
Nov. 24, 2005 (EP) .................................. 05111261

(51) Int. Cl.
*G06F 21/31* (2013.01)
*G06F 21/41* (2013.01)

(52) U.S. Cl.
CPC ............... *G06F 21/31* (2013.01); *G06F 21/41* (2013.01); *G06F 2221/2113* (2013.01); *G06F 2221/2143* (2013.01)

(58) Field of Classification Search
CPC ....................................................... G06F 21/31
USPC .................................. 726/2–8; 713/182–183
See application file for complete search history.

(56) References Cited

U.S. PATENT DOCUMENTS 5,226,172 A * 7/1993 Seymour et al. ............... 709/222
5,418,854 A * 5/1995 Kaufman et al. .............. 713/156
(Continued)

FOREIGN PATENT DOCUMENTS

| EP | 0 717 339 A2 | 6/1996 |
|---|---|---|
| JP | H08263417 A | 10/1996 |
| JP | 2002183094 A | 6/2002 |
| JP | 2003228509 A | 8/2003 |
| JP | 2003323409 A | 11/2003 |

OTHER PUBLICATIONS

Satyanarayanan; Integrating security in a large distributed system; Published in: Journal ACM Transactions on Computer Systems (TOCS); TOCS Homepage archive vol. 7 Issue 3, Aug. 1989; pp. 247-280; ACM Digital Library.*
(Continued)

*Primary Examiner* — Bradley Holder
(74) *Attorney, Agent, or Firm* — Stephen R. Tkacs; Stephen J. Walder, Jr.; Joseph Petro Kaitis

(57) ABSTRACT mechanisms are provided to securely access systems of a distributed computer system by entering passwords. Some systems are accessible by equal, and some systems are accessible by different passwords. The mechanisms store information, which systems (I, II) are accessible by equal, and which are accessible by different passwords and ask to enter a proper password when opening a session by accessing a system of the distributed computer system. The mechanisms cache the password and use the stored information to verify, if another system to be accessed during the current session is accessible by an equal password like a system already accessed during said session. If the result of the verification is true, the mechanisms re-use the adequate cached password. If the result of the verification is false, the mechanism ask to enter a proper password to access the other system and cache the password required to access the other system in a way that during the current session, it can be re-used when accessing other systems accessible by the same password.

20 Claims, 3 Drawing Sheets

(56) References Cited

U.S. PATENT DOCUMENTS

Figure 1:
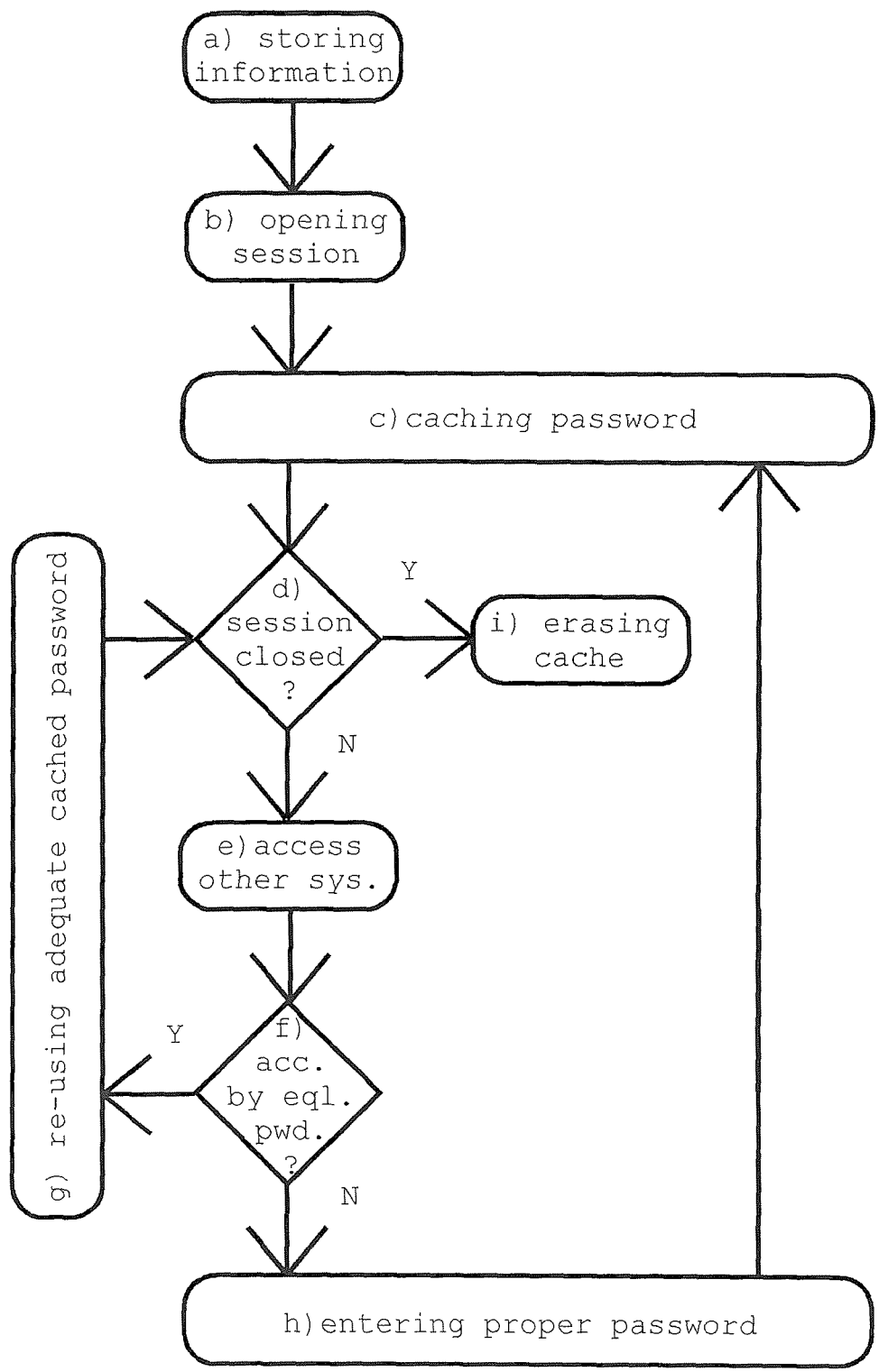

| | | | |
|---|---|---|---|
| 5,491,752 A * | 2/1996 | Kaufman et al. | 380/30 |
| 5,581,700 A * | 12/1996 | Witte | 726/19 |
| 5,778,065 A * | 7/1998 | Hauser et al. | 713/155 |
| 6,006,334 A * | 12/1999 | Nguyen et al. | 726/5 |
| 6,061,799 A * | 5/2000 | Eldridge et al. | 726/20 |
| 6,094,721 A * | 7/2000 | Eldridge et al. | 713/168 |
| 6,161,178 A * | 12/2000 | Cromer et al. | 713/2 |
| 6,996,718 B1 * | 2/2006 | Henry et al. | 713/182 |
| 7,080,077 B2 * | 7/2006 | Ramamurthy et al. | 707/754 |
| 7,251,732 B2 * | 7/2007 | Jamieson et al. | 713/182 |
| 7,363,416 B2 * | 4/2008 | Chu | 710/313 |
| 7,392,536 B2 * | 6/2008 | Jamieson et al. | 726/8 |
| 2003/0154413 A1 * | 8/2003 | Shigeeda | 713/202 |
| 2003/0163730 A1 * | 8/2003 | Roskind et al. | 713/201 |
| 2004/0260942 A1 * | 12/2004 | Jamieson et al. | 713/201 |
| 2005/0015490 A1 * | 1/2005 | Saare et al. | 709/225 |

OTHER PUBLICATIONS

Tobbicke; Distributed file systems: focus on Andrew File System/ Distributed File Service (AFS/DFS); Published in: Mass Storage Systems, 1994. 'Towards Distributed Storage and Data Management Systems.' First International Symposium. Proceedings., Thirteenth IEEE Symposium on;Date of Conference: Jun. 1994; pp. 23-26; IEEE Xplore.*

"Logon Assist for Multiple Logons", IBM Corporation, IBM Technical Disclosure, vol. 32, No. 8A, Jan. 1990, pp. 303-305.

PCT International Search Report (PCT/ISA210) and Written Opinion (PCT/ISA/237) for Application No. PCT/EP2006/065398 dated Nov. 3, 2006, 10 pages.

* cited by examiner

SECURE ACCESS TO A PLURALITY OF SYSTEMS OF A DISTRIBUTED COMPUTER SYSTEM BY ENTERING PASSWORDS

BACKGROUND OF THE INVENTION

The invention relates to a method to securely access systems of a distributed computer system by entering passwords, wherein some of the systems are accessible by equal, and some of the systems are accessible by different passwords.

Modern computer systems, particularly distributed computer systems as well as many applications and services are protected by passwords. Thereby the problem arises that users have too many passwords that expire at different points in time and have different password rules. Furthermore some systems enforce password rules wherein others do not. In general users often choose the same password for multiple systems in order to easily keep them in mind. Moreover users also often write down the passwords, which violates the basic security rules for passwords.

Forgotten passwords lead to a high helpdesk call rate involving high costs. About 30% of all helpdesk requests are password related.

An approach to solve the problem of managing multiple passwords is single sign on (SSO). SSO is a mechanism whereby a single action of user authentication and authorization can permit a user to access all computers, systems and/or multiple application components in a distributed application environment to which the user has access permission, without the need to enter multiple passwords.

Two categories of products supporting SSO are known. One is password synchronization, the other is database-based passwords with master password.

Products supporting password synchronization use one single password to access multiple systems. Password synchronization allows the user to change the password for multiple systems with a single user action. A disadvantage of password synchronization is that if the password gests in the hand of the wrong person all systems can be directly accessed by this person with this password. Due to this, password synchronization is insecure.

Products supporting database-based passwords with master password use a database to store multiple passwords for multiple systems. The user gets access to all systems by entering the master password, wherein the SSO product will lookup the correct password for a given system in the database. This database must therefore store the passwords with a two-way encryption in order to retrieve the passwords later in clear to authenticate the user. A disadvantage of such database-based passwords with master password is that the two-way encryption is insecure if the system passwords are stored in high secure products such as Resource Access Control Facility (RACF) with one-way encryption. Thereby one-way encryption is an algorithm, like e.g. Secure Hash Algorithm (SHA), that encodes a sequence of characters, like e.g. a password, in a way that it is not possible to write other algorithms to restore the original sequence of characters, wherein two-way encryption is an algorithm, like e.g. Data Encryption Standard (DES), that encodes a sequence of characters in a way that it is only possible to restore the original sequence of characters by the same algorithm. Again, if the master password gets in the hand of the wrong person then all systems can be accessed with this one password using the SSO product.

Because of the fact that SSO gives the users master password access to all systems, it is recommended to use smart cards, biometric scanners or both instead of a single master password. Some SSO products support such features.

Moreover commercial SSO products for the complete Information Technology (IT) infrastructure are very expensive and can lead to its own problems, such as the drawbacks mentioned above.

OBJECT OF THE INVENTION

An object of the invention is to improve security of SSO products and of distributed computer systems providing password protection.

DISCLOSURE OF THE INVENTION AND ITS ADVANTAGES

The object of the invention is met by the proposed method to securely access systems of a distributed computer system by entering passwords, wherein some of the systems of the distributed computer systems are accessible by equal, and some are accessible by different passwords, said method comprising the steps of:

storing information, which systems of the distributed computer system are accessible by equal, and which systems of the distributed computer system are accessible by different passwords, asking the user to enter a proper password when opening a session by accessing a first system of said distributed computer system, caching said password in a way that during the current session, it can be re-used when accessing other systems of the distributed computer system accessible by the same password, using the stored information to verify, if another system to be accessed during the current session is accessible by an equal password like a system already accessed during said session, if the result of the verification is true, re-using the adequate cached password to access the other system, if the result of the verification is false, asking the user to enter a proper password to access the other system, and caching said password required to access the other system in a way that during the current session, it can be re-used when accessing other systems of the distributed computer system accessible by the same password.

Thereby quitting all systems of the distributed computer system accessed during said session preferably closes the current session so that a new session is started when again accessing a system of the distributed computer system after quitting all systems of the distributed computer system.

Accessing a system takes place e.g. by starting or selecting an application, accessing a storage, using a document and the like e.g. by the user clicking a button in an application, clicking an icon on the desktop and the like.

Quitting a systems accessed during the session can take place e.g. automatically by a timeout, by closing a document or by quitting an application. Thereby it is thinkable, that a distributed computer system features an automatic timeout for all systems e.g. after one hour without interaction, so that after one hour without interaction all systems are quitted. It is thinkable that the cached passwords expire with a delay of e.g. 30 minutes, i.e. after one and half an hour without interaction all cached passwords are expired.

Thereby the term 'distributed computer system' comprises a distributed arrangement of personal computers, servers, storages and other hardware devices, each one accessible by a password, as well as a distributed application environment, wherein different applications located on the same or on different computers, servers and other hardware devices and using different resources can be remotely accessed by one or more terminals by passwords. The term 'system' comprises hardware devices like personal computers, servers, storages and other resources of the distributed computer system as well as applications, databases and the like stored on such hardware devices that are individually accessible by a password.

Furthermore the term 'cached' or 'caching' means a non-persistent storage like e.g. in a Random Access Memory (RAM) and the like in contrast to a persistent storage like e.g. in a database, a disk-storage and the like. The caching only takes place during the session, wherein it is thinkable that the cached passwords are deleted actively when closing the session e.g. by erasing the cache.

The method according to the invention has the advantage over the state of the art, that the user similar to known SSO products does not have to enter his password for each system he wants to access, wherein in contrast to known SSO products, the password is neither used to immediately access all systems accessible by said password, nor the passwords required to access different systems are stored persistently in a database and the like of the distributed computer system. The cached password is only used to access a system accessible by the cached password the very moment a particular system is chosen to be accessed by the user.

Doing so it is not possible to change the passwords of all systems accessible with equal passwords by a single user action if the password gets in the hands of the wrong person, since a cached password is only used when accessing another system accessible with the same password but it is not used if a system accessible with that password is not accessed during a session. Furthermore it is not possible to get the password by ransacking e.g. a database because the passwords are not stored persistently but only in a cache that is used to store the passwords only during the session.

In a preferred embodiment of said method according to the invention, configuring which systems can be accessed by equal and which systems can be accessed by different passwords is done by the user himself and/or by an administrator of the distributed computer system and/or is determined by the distributed computer system.

In another preferred embodiment of said method according to the invention the cached passwords is deleted at the end of the session. Doing so the password cannot be stolen by ransacking databases, memory dumps and the like of the distributed computer system.

In an additional preferred embodiment of said method according to the invention the passwords are cached in an encrypted manner to prevent clear text passwords in a memory dump. The encryption to be used for the cached passwords preferably is a two-way encryption.

In a particularly preferred embodiment of said method according to the invention said distributed computer system comprises at least two different security zones, wherein systems located in different security zones are only accessible by different passwords. To access a system located in a first security zone, the user has to enter a first password. The first password is cached and the cached first password is re-used to access other systems located in the first security zone accessible by the same first password. To access a system located in a second security zone the user is asked to enter a second password that again is cached and is re-used to access other systems of the second security zone accessible by the same second password. Thereby it is thinkable that depending e.g. on user settings some systems of the same security zone are accessible by another password. By dividing the distributed computer system into different security zones, it is not possible to access systems located in different security zones with the same password. This increases security. On the other hand by allowing to use the same password to access systems located in the same security zone, user interaction is still convenient since the user has to deal only with few passwords.

Another part of the object of the invention is met by a distributed computer system to be used to perform the method described above, wherein said distributed computer system at least comprises two systems accessible by equal passwords, means to store information, which systems are accessible by equal, and which systems are accessible by different passwords, means to cache passwords entered to access systems of said distributed computer system, means to use the stored information to verify, if another system to be accessed during the current session is accessible by an equal password like a system already accessed during said session, and means to re-use an adequate cached password when accessing another system of said distributed computer system accessible by an equal password like a system already accessed during said session. Thereby the information which systems require equal and which systems require different passwords preferably is stored persistently in the distributed computer system. So it is thinkable that this information is stored locally in a user terminal, or centrally on a server.

In a preferred embodiment of the distributed computer system according to the invention said distributed computer system at least comprises two different security zones, wherein systems located in different security zones require different passwords to access them. Thereby the definition of the different security zones preferably is stored persistently in the distributed computer system. If a user tries to access two systems located in different security zones by the same password, the access is denied.

An additional preferred embodiment of the distributed computer system according to the invention comprises means to allow a user of the distributed computer system and/or an administrator of the distributed computer system to configure which systems are accessible by equal, and which systems are accessible by different passwords.

In a particularly preferred embodiment of the invention, the method mentioned above is performed by a computer program product stored on a computer usable medium comprising computer readable program means for causing a computer to perform the method mentioned above, when said computer program product is executed on a computer. Thereby the computer program product must implement a runtime in-memory password cache which holds the passwords during a session.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The foregoing, together with other objects, features, and advantages of this invention can be better appreciated with reference to the following specification, claims and drawings.

Figure 2:
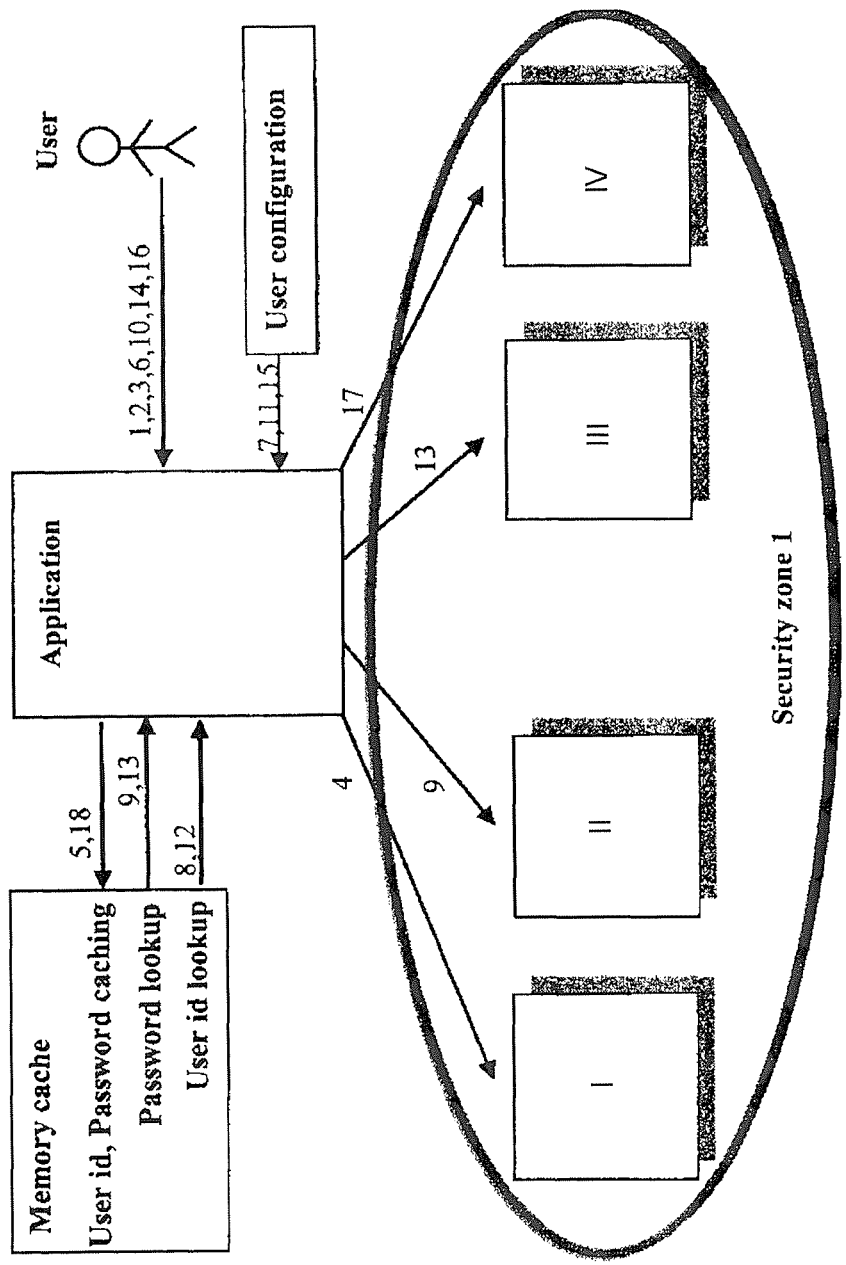
Figure 3:
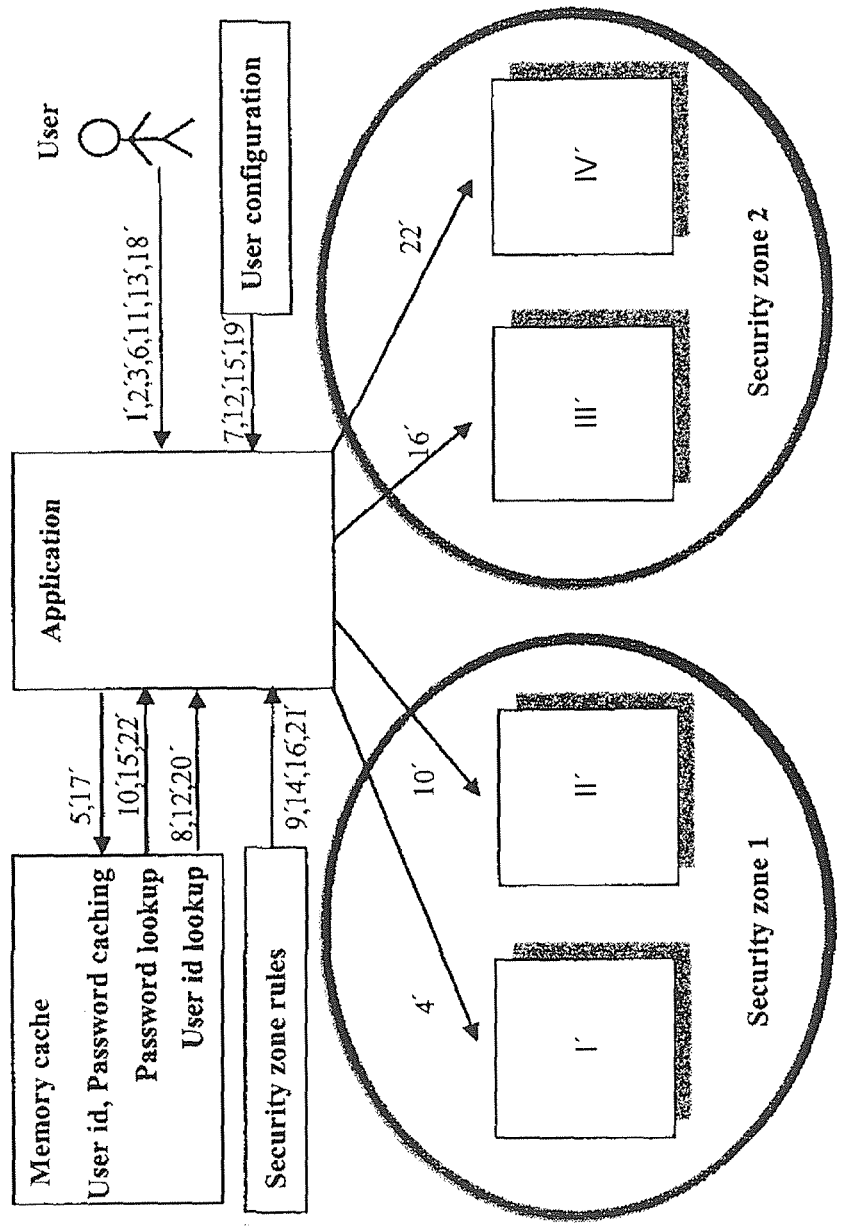

Brief description of the drawings, with:

FIG. 1 showing a flowchart of a method according to the invention,

FIG. 2 showing a scheme of a distributed computer system comprising four systems accessible by a user via an application causing the distributed computer system to perform the method according to the invention, wherein the steps performed when a user accesses those four systems are also shown in the scheme, and FIG. 3 showing a scheme of another distributed computer system comprising four different systems located in two different security zones, wherein the steps performed when a user accesses those four systems are also shown in the scheme.

As it can be seen in FIG. 1, a method according to the invention can be depictured in nine steps a) to i).

In step a) information is stored, which systems of a distributed computer system are accessible by equal, and which systems are accessible by different passwords.

In step b) a user opens a session by accessing a first system of the distributed computer system. Opening a session takes place e.g. by starting a user terminal of the distributed computer system, by starting an application, by accessing a server of the distributed computer system and the like. Thereby the user is asked to enter a proper password to access the first system. If the right password is entered, the user has access to the first system and the session is opened. Preferably in step b) the user is also asked to enter his user-identification (user-ID). This is required, e.g. to verify which systems the user is allowed to access.

In step c) the password is cached in a way it can be re-used during the current session to access other systems of the distributed computer system accessible by an equal password like a system already accessed during the current session. Preferably also the user-ID entered in step b) is cached in step c).

In step d) a verification takes place, if the session is still active, or if the session is closed. If the session is still active, the method proceeds with step e), if the session is closed, e.g. by quitting all systems of the distributed computer system, the method proceeds with step i).

In step e) the user wants to access another system of the distributed computer system, e.g. by requesting a document stored on another system.

In step f) a verification takes place, if the other system is accessible by a password equal to a password of a system already accessed during the current session.

If the user during the current session did already access a system that requires the same password like the system actually to be accessed, in step g) an adequate cached password is re-used to access the other system. Preferably in step g) also the cached user-ID is used to verify if the user is allowed to access the other system. After step g) the method proceeds with step d).

If the other system requires another password than any system already accessed during the current session, in step h) the user is asked to enter a proper password to access the other system. Preferably when entering the proper password, the cached user-ID is re-used so that the user does not have to enter his user-ID anymore. Furthermore this allows a control, if the user is allowed to access the other system.

This newly entered password also is stored in step c), wherein now, both, the first and the second entered password are available to be re-used to access other systems of the distributed computer system accessible by one of the cached passwords. The method now proceeds with step d).

If step d) leads to the result, that the session is closed, the method proceeds with step i) wherein the cached passwords are deleted by erasing the cache.

If the distributed computer system comprises at least two systems that are accessible by different passwords a method according to the invention is executed as follows:

storing information, which systems are accessible by equal, and which systems are accessible by different passwords, asking the user to enter a proper first password when opening a session by accessing a first system of said distributed computer system, caching said first password during said session, when accessing a second system of said distributed computer system, using the stored information to verify, if said second system is accessible by the same password like the first system, re-using said cached first password when the result of the verification is that the second system is accessible by the same first password like the first system, asking the user to enter a second password when the result of the verification is that the second system is accessible by another password than the first system already accessed, caching also said second password during said session, and re-using said cached second password when accessing another system accessible by said second password.

The execution of a method according to the invention when accessing a distributed computer system comprising at least two systems accessible by different passwords can be better understood regarding FIG. 2 and FIG. 3. Thereby in FIG. 2 and FIG. 3 the execution of a method according to the invention is described very exactly, wherein the steps required are subdivided into detailed single actions.

As shown in FIG. 2, a distributed computer system comprises four systems I, II, III, IV located in the same security zone that can be accessed by passwords. A user authenticated to access all four systems accesses them one by one. Systems I, II, III are accessible by the same passwords, wherein system IV requires a password different from the passwords of systems I, II, III. This information is stored in a user configuration.

Accessing those systems by a user authenticated to access systems I, II, III and IV takes place in the following steps:

To access the systems I, II, III, IV in a first step 1 the user starts an application, which, depending on which system the user wants to access first, asks the user for the specific password of the first system to be accessed. The application preferably comprises a computer program product comprising computer readable program means for causing a computer to perform a method mentioned above, when said computer program product is executed on a computer.

In a second step 2 the user chooses system I to access first.

In a third step 3 the application asks the user to enter his user-ID and the password for system I.

By checking the user-ID the application checks if the user is allowed to access system I. If the user is allowed to and if the password is correct, the application in a fourth step 4 logs the user in to system I.

In a fifth step 5 the application caches the user-ID, the password and the name of system I.

In a sixth step 6 the user chooses system II to access.

In a seventh step 7 the application checks the user configuration, if system II should use the same password as system I.

Because this is true, in an eight step 8 the application does a user-ID lookup in the cache to check if the user-ID is already cached for one of the systems found in the user configuration.

In a ninth step 9 the application logs the user in to system II by using the user-ID and the cached password used to access system I. The cached password is received from the cache by a password lookup.

In a tenth step 10 the user chooses to access system III.

In step 11 the application again checks the user configuration, if system III should use the same password as system I.

Because this is true, in a twelfth step 12 the application does a user-ID lookup in the cache to check if the user-ID is already cached for one of the systems found in the user configuration.

In a thirteenth step 13 the application logs the user in to system III by using the user-ID and the cached password used to access system I. The cached password is received from the cache by a password lookup.

In a fourteenth step 14 the user selects to access system IV.

In step 15 the application again checks the user configuration, if system IV should use the same password as system I.

Because this is false, in a sixteenth step 16 the user has to enter his user-ID and the password of system IV.

By checking the user-ID the application checks if the user is allowed to access system IV. If the user is allowed to and if the password is correct, the application in a seventeenth step 17 logs the user in to system IV.

In an eighteenth step 18 the application caches the user-ID, the password and the name of system IV.

The distributed computer system shown in FIG. 3 also comprises four systems I', II', III', IV' that can be accessed by passwords. Thereby the systems I' and II' are located in a first security zone and the systems III' and IV' are located in a second security zone. Systems I' and II' are accessible by the same passwords as well as systems III' and IV' are accessible by the same passwords that differ from the passwords of systems I' and II'. This information is stored in a user configuration. A user authenticated to access all four systems accesses them one by one.

Accessing those systems by a user authenticated to access systems I, II, III and IV takes place in the following steps:

To access the systems I', II', III', IV' in a first step 1' the user starts an application that, depending on which system the user wants to access first, asks the user for the specific password of the first system to be accessed. The application preferably comprises a computer program product comprising computer readable program means for causing a computer to perform a method mentioned above, when said computer program product is executed on a computer.

In a second step 2' the user chooses system I' to access first.

In a third step 3' the application asks the user to enter his user-ID and the password for system I'.

In a fourth step 4' the application logs the user in to system I'.

In a fifth step 5' the application caches the user-ID, the password and the name of system I'.

In a sixth step 6' the user chooses system II' to access.

In a seventh step 7' the application checks the user configuration, if system II' should use the same password as system I'.

Because this is true, in an eight step 8' the application does a user-ID lookup in the cache to check if the user-ID is already cached for one of the systems found in the user configuration.

In a ninth step 9' the application checks the rules defined by the administrator of the distributed computer system if system II' is located in the same security zone as system I'.

Because this is true, the application in a tenth step 10' logs the user in to system II' by using the user-ID and the cached password used to access system I'. The cached password is received from the cache by a password lookup.

In a eleventh step 11' the user chooses to access system III'.

In step 12' the application again checks the user configuration, if system III' should use the same password as system I'.

Because this is false, the application asks the user to enter his user-ID and password for system III' in a thirteenth step 13'.

In a fourteenth step 14' the application checks the rules defined by the administrator of the distributed computer system if system III' is located in the same security zone as system I'.

Because this is false, the application in a fifteenth step 15' checks the password cache if the password for the second security zone is different from the first security zone.

Because this is true, in step 16' the application uses the user-ID and the password of step 13' to log the user in to system III'.

In a seventeenth step 17' the application caches the user-ID, the password and the name of system III'.

In an eighteenth step 18' the user selects to log in system IV'.

In a nineteenth step 19' the application checks the user configuration, if system IV' should use the same password as system III'.

Because this is true, in a twentieth step 20' the application does a user-ID lookup in the cache to check if the user-ID is already cached for one of the systems found in the user configuration.

In a twenty-first step 21' the application checks the rules defined by the administrator of the distributed computer system if system IV is located in the same security zone as system III'.

Because this is true, in a twenty-second step 22' the application logs the user in to system IV by using the user-ID and the cached password used to access system III'. The cached password is received from the cache by a password lookup.

In general, in combination with a distributed computer system comprising at least two different security zones, wherein systems of different security zone are accessed by different passwords, the method according to the invention is executed in a way that the user has to enter at least a first password for accessing a system located in a first security zone and has to enter at least a second password for accessing a system located in a second security zone, wherein the passwords are cached during the session and the cached passwords are re-used to access other systems the user is allowed to access of the same security zones during that session. When finishing the session, the cached passwords are deleted.

It is important to mention that the method according to the invention supports cross-cluster authentication and cross-platform authentication as well as it is also applicable in other contexts, e.g. within a cluster.

The invention shows the following advantages:

user logins can be highly reduced if many systems are involved, the user must remember less different passwords leading to less forgotten password helpdesk calls, depending on the distributed computer system the user can configure which systems use the same passwords, leading to a high scalability, different passwords can be enforced for different security zones, wherein no master password exists, the passwords are not stored persistently, an implementation of a method according to the invention is simple and cheap and has a low security risk for the complete IT-infrastructure, it can be applied to a variety of existing applications without changing the complete IT-infrastructure.

To configure which systems use the same passwords the user configures in the application which specific set of systems use the same password. This information is stored persistently e.g. in a file or in a database with an optional two-way encryption.

Furthermore, the administrator of the distributed computer system may optional configure rules for the application to define different security zones which require and enforce different passwords. This information is stored persistently e.g. in a file, in a database or hard-coded in the application with an optional two-way encryption. If the user enters the same password for two different security zones then the login to the second zone will be rejected by the application.

To synchronize the passwords in a given security zone it is thinkable to use a SSO product supporting password synchronization. It is also thinkable that the user does this manually. A security zone can comprise e.g. all UNIX systems or all Window systems or all mainframe systems or the like.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method to securely access a plurality of systems of a distributed computer system by entering passwords, the method comprising:
   storing information identifying a first set of systems within the plurality of systems that are accessible by equal passwords and a second set of systems within the plurality of systems that are accessible by different passwords;
   prompting a user to enter a first password responsive to the user requesting to open a first session by accessing a first system within the first set of systems of the distributed computer system;
   caching the first password to be re-used when accessing other systems accessible by the first password;
   responsive to the user requesting to access a second system within the first set of systems, using the stored information to determine whether the second system to be accessed within the current session is accessible by the first password;
   responsive to the result of the determination being true, re-using the cached password to access the second system; and
   responsive to the result of the determination being false, prompting the user to enter a second password to access the second system and caching the second password required to access the second system to be re-used when accessing other systems accessible by the second password.

2. The method of claim 1, wherein configuring which systems are accessible by equal passwords and which systems can be accessed by different passwords is performed by the user.

3. The method of claim 1, wherein the cached passwords are deleted at the end of the session.

4. The method of claim 1, wherein the passwords are cached in an encrypted manner.

5. The method of claim 1, wherein the distributed computer system comprises at least two different security zones, wherein systems located in different security zones are accessible by different passwords.

6. The method of claim 5, further comprising:
   responsive to the user requesting to access a third system within the second set of systems, using the stored information to determine whether the third system to be accessed within the current session is accessible by the first password;
   responsive to the result of the determination being true, determining whether the third system is in a different security zone from the first system;
   responsive to a determination that the third system is in a different security zone from the first system, determining whether a cached password for the third system is different from a cached password for the first system; and
   re-using the cached password for the third system to access the third system responsive to a determination that the cached password for the third system is different from the cached password for the first system.

7. The method of claim 6, wherein determining whether the third system is in a different security zone from the first system comprises checking security zone rules defined by an administrator of the distributed computing system.

8. The method of claim 6, further comprising:
   responsive to a determination that the third system is not in a different security zone from the first system, re-using the cached password for the first system to access the third system.

9. A system for securely accessing a plurality of systems of a distributed computer system, the system comprising:
   a computer system; and
   a computer readable storage memory having a computer readable program stored therein, where the computer readable program, when loaded and executed by the computer system, causes the computer system to:
   store information identifying a first set of systems within the plurality of systems that are accessible by equal passwords and a second set of systems within the plurality of systems that are accessible by different passwords;
   prompt a user to enter a first password responsive to the user requesting to open a first session by accessing a first system within the first set of systems of the distributed computing system;
   cache the first password to be re-used when accessing other systems accessible by the first password;
   responsive to the user requesting to access a second system within the first set of systems, use the stored information to determine whether the second system to be accessed within the current session is accessible by the first password;
   responsive to the result of the determination being true, re-use the cached first password to access the second system; and
   responsive to the result of the determination being false, prompt the user to enter a second password to access the second system and cache the second password required to access the second system to be re-used when accessing other systems accessible by the second password.

10. The system of claim 9, wherein the distributed computer system comprises two different security zones, wherein systems located in different security zones are accessible by different passwords.

11. The system of claim 10, wherein an administrator configures the first set of systems that are accessible by equal passwords and the second set of systems that are accessible by different passwords.

12. The system of claim 10, wherein the computer readable program further causes the computer system to:
responsive to the user requesting to access a third system within the second set of systems, use the stored information to determine whether the third system to be accessed within the current session is accessible by the first password;
responsive to the result of the determination being true, determine whether the third system is in a different security zone from the first system;
responsive to a determination that the third system is in a different security zone from the first system, determine whether a cached password for the third system is different from a cached password for the first system; and
re-use the cached password for the third system to access the third system responsive to a determination that the cached password for the third system is different from the cached password for the first system.

13. The system of claim 12, wherein determining whether the third system is in a different security zone from the first system comprises checking security zone rules defined by an administrator of the distributed computing system.

14. The system of claim 12, wherein the computer readable program further causes the computer system to:
responsive to a determination that the third system is not in a different security zone from the first system, re-use the first cached password to access the third system.

15. The system of claim 9, wherein configuring which systems are accessible by equal passwords and which systems can be accessed by different passwords is performed by the user.

16. The system of claim 9, wherein the cached passwords are deleted at the end of the session.

17. The system of claim 9, wherein the passwords are cached in an encrypted manner.

18. A computer program product in a non-transitory computer readable medium having a computer readable program stored therein for securely accessing a plurality of systems of a distributed computer system by entering passwords, where the computer readable program, when loaded and executed by a computer system, causes the computer system to:
store information identifying a first set of systems within the plurality of systems that are accessible by equal passwords and a second set of systems within the plurality of systems that are accessible by different passwords;
prompt a user to enter a first password responsive to a request to open a first session by accessing a first system within the first set of systems of the distributed computer system;
cache the first password to be re-used when accessing other systems accessible by the first password;
responsive to the user requesting to access a second system within the first set of systems, use the stored information to determine whether the second system to be accessed within the current session is accessible by the first password;
re-use the cached password to access the second system responsive to the result of the determination being true; and
prompt the user to enter a second password to access the second system and cache the second password required to access the second system to be re-used when accessing other systems accessible by the second password responsive to the result of the determination being false.

19. The computer program product of claim 18, wherein the computer readable program further causes the computer system to:
responsive to the user requesting to access a third system within the second set of systems, use the stored information to determine whether the third system to be accessed within the current session is accessible by the first password;
responsive to the result of the determination being true, determine whether the third system is in a different security zone from the first system;
responsive to a determination that the third system is in a different security zone from the first system, determine whether a cached password for the third system is different from a cached password for the first system; and
re-use the cached password for the third system to access the third system responsive to a determination that the cached password for the third system is different from the cached password for the first system.

20. The computer program product of claim 19, wherein the computer readable program further causes the computer system to:
responsive to a determination that the third system is not in a different security zone from the first system, re-use the first cached password to access the third system.

\* \* \* \* \*